US011953206B2

(12) United States Patent
Karishuku et al.

(10) Patent No.: US 11,953,206 B2
(45) Date of Patent: Apr. 9, 2024

(54) BURNER AND COMBUSTOR

(71) Applicant: MITSUBISHI HEAVY INDUSTRIES, LTD., Tokyo (JP)

(72) Inventors: Mitsuhiro Karishuku, Yokohama (JP); Satoshi Dodo, Yokohama (JP); Yoshitaka Hirata, Yokohama (JP); Tomohiro Asai, Yokohama (JP); Shohei Yoshida, Yokohama (JP); Yasuhiro Akiyama, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/946,254

(22) Filed: Sep. 16, 2022

(65) Prior Publication Data
US 2023/0167976 A1 Jun. 1, 2023

(30) Foreign Application Priority Data
Sep. 30, 2021 (JP) .................. 2021-160273

(51) Int. Cl.
*F23R 3/34* (2006.01)
*F02C 7/22* (2006.01)
(Continued)

(52) U.S. Cl.
CPC .............. *F23R 3/343* (2013.01); *F02C 7/222* (2013.01); *F23D 11/101* (2013.01); *F23D 14/02* (2013.01);
(Continued)

(58) Field of Classification Search
CPC ...... F23D 11/00; F23D 11/101; F23D 11/103; F23D 11/106; F23D 11/107;
(Continued)

(56) References Cited

U.S. PATENT DOCUMENTS 5,605,287 A * 2/1997 Mains ................... F23D 11/107
239/416.4
2010/0223929 A1 9/2010 Bailey et al.
(Continued)

FOREIGN PATENT DOCUMENTS

JP 2016-099107 A 5/2016
JP 2018-535384 A 11/2018

OTHER PUBLICATIONS

Office Action dated May 2, 2023, issued in counterpart JP application No. 2021-160273, with English translation. (6 pages).

*Primary Examiner* — Scott J Walthour
(74) *Attorney, Agent, or Firm* — WHDA, LLP

(57) ABSTRACT

Provided is a burner of double tube structure including an outer tube and an inner tube. The inner tube includes a tip-side support portion fixed on the outer tube, a base-side support portion fixed on the outer tube, a main body portion supported by the tip-side support portion, bellows interposed between the main body portion and the base-side support portion, and a bulkhead member attached at a position between the tip-side support portion and the base-side support portion. Between an outer peripheral surface of the bulkhead member and an inner peripheral surface of the outer tube, a second gap smaller than a first gap between an outermost peripheral surface of the bellows and the inner peripheral surface of the outer tube is interposed.

5 Claims, 4 Drawing Sheets

(51) Int. Cl.
*F23D 11/10* (2006.01)
*F23D 14/02* (2006.01)
*F23R 3/28* (2006.01)

(52) U.S. Cl.
CPC .......... *F23R 3/283* (2013.01); *F05D 2220/32* (2013.01); *F05D 2240/35* (2013.01); *F23R 2900/00001* (2013.01)

(58) Field of Classification Search
CPC ...... F23D 11/383; F23D 11/402; F23D 14/02; F23D 2202/00; F23D 2203/00; F23D 2204/10; F23D 2206/10; F23R 3/343; F23R 3/283; F23R 2900/00001
See application file for complete search history.

(56) References Cited

U.S. PATENT DOCUMENTS

| | | | |
|---|---|---|---|
| 2012/0228397 A1* | 9/2012 | Thomson | F23D 11/107 239/553 |
| 2016/0146459 A1 | 5/2016 | Gibson et al. | |
| 2017/0146235 A1 | 5/2017 | Marchal et al. | |

\* cited by examiner

BURNER AND COMBUSTOR

BACKGROUND OF THE INVENTION

1. Field of the Invention

The present invention relates to a burner and combustor for use in a gas turbine engine.

2. Description of the Related Art

Burners for use in combustors of gas turbine engines include those which allow, with bellows, for thermal deformations in an axial direction during operation of the gas turbine engines (JP-2016-99107-A).

PRIOR ART DOCUMENT

Patent Document

Patent Document 1: JP-2016-99107-A

SUMMARY OF THE INVENTION

During operation of a gas turbine engine, mechanical vibrations of the gas turbine engine and combustion vibrations of its combustor are transmitted to a burner. The burner is therefore not only thermally deformed, but also vibrated. Use of bellows formed of thin metal plates hence involves a problem that the bellows may be damaged through interfere with its surrounding structure. Further, the bellows themselves deform in a radial direction under heat.

The present invention has, as an object thereof, the provision of a burner and a combustor, which can cope flexibly with thermal deformations using bellows, and at the same time can suppress damage to the bellows.

To achieve the above-described object, the present invention provides a burner of double tube structure including an outer tube and an inner tube. The inner tube includes a tip-side support portion fixed on the outer tube, a base-side support portion fixed on the outer tube, a main body portion supported by the tip-side support portion, bellows interposed between the main body portion and the base-side support portion, and a bulkhead member attached at a position between the tip-side support portion and the base-side support portion. Between an outer peripheral surface of the bulkhead member and an inner peripheral surface of the outer tube, a second gap smaller than a first gap between an outermost peripheral surface of the bellows and the inner peripheral surface of the outer tube is interposed.

According to the present invention, thermal deformations can be flexibly coped with, owing to the use of the bellows, and at the same time damage to the bellows can be suppressed.

DESCRIPTION OF THE PREFERRED EMBODIMENTS

Embodiments of the present invention will hereinafter be described using the accompanying drawings.

First Embodiment

1. Gas Turbine Plant

Figure 1:
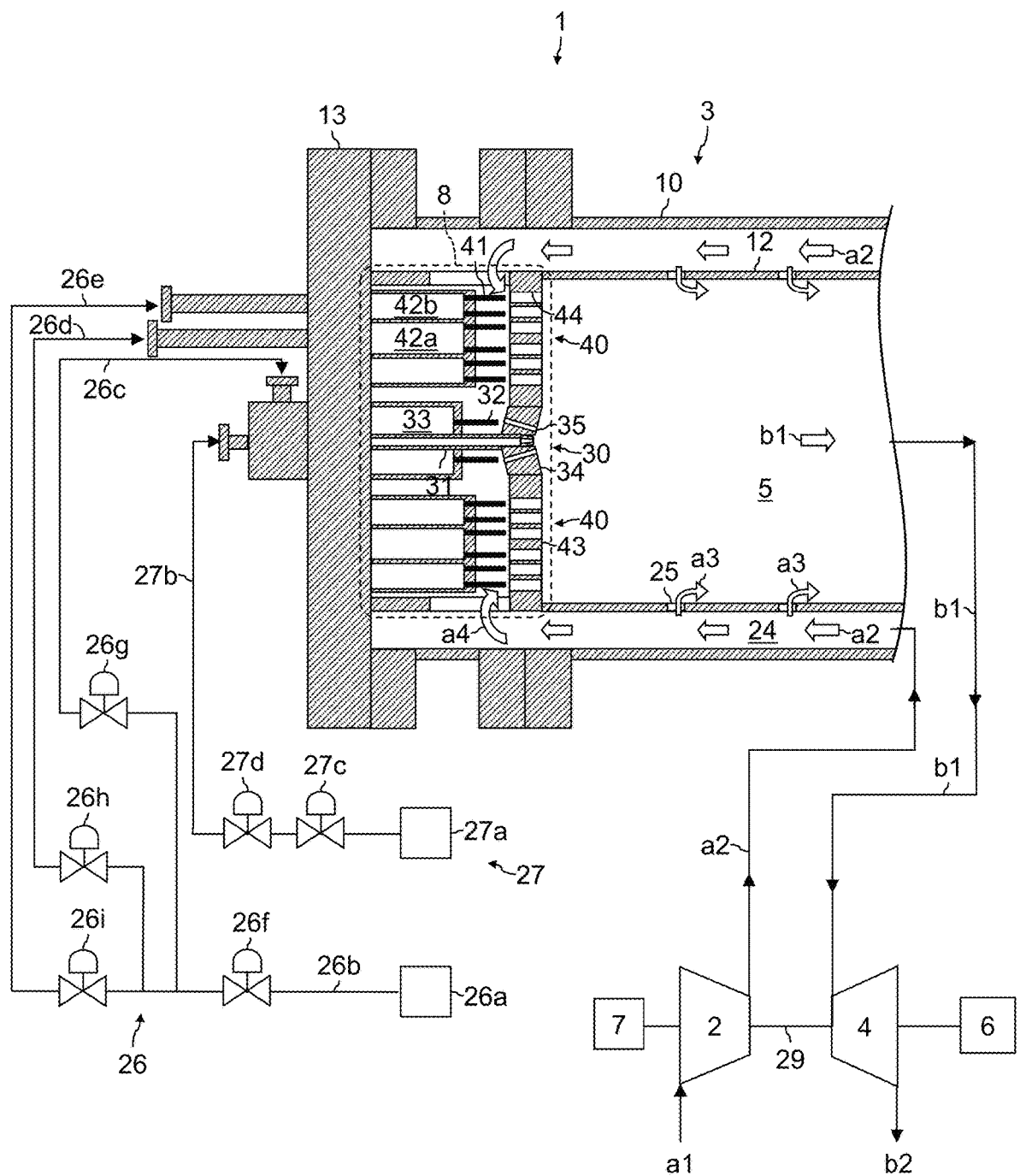
FIG. 1 is a diagram showing a configuration example of a gas turbine plant with a burner according to a first embodiment of the present invention applied thereto.

FIG. 1 is a diagram showing a configuration example of a gas turbine plant with a burner according to a first embodiment of the present invention applied thereto. The gas turbine plant 1 shown in FIG. 1 includes a compressor 2, a combustor 3, a gas turbine 4, a generator 6, and a starter motor 7. The compressor 2, the combustor 3, and the gas turbine 4 make up a gas turbine engine that drives the generator 6.

The compressor 2 is started by the starter motor 7, compresses air a1 drawn from an intake port (not shown) to generate compressed air a2 of high pressure, and supplies the compressed air a2 to the combustor 3. The combustor 3 mixes the compressed air a2, which has been supplied from the compressor 2, with fuel, burns the fuel to generate combustion gases b1 of high temperature, and supplies the combustion gases b1 to the gas turbine 4. The gas turbine 4 is driven by the combustion gases b1 supplied from the combustor 3. After driving the gas turbine 4, the combustion gases b1 are released as exhaust gases b2 from the gas turbine 4. The generator 6 is driven by a rotational drive force obtained at the gas turbine 4, and generates electricity. In this embodiment, the compressor 2, the gas turbine 4, and the generator 6 are connected together by a shaft 29.

2. Combustor

The combustor 3 includes an outer tube 10, an inner tube 12, an end cover 13, a burner 8, a main fuel system 26, and a pilot fuel system 27.

2-1. Outer Tube, Inner Tube, and End Cover

The inner tube 12 is disposed on a downstream side of the burner 8 in a flow direction of the combustion gases b1. The inner tube 12 is formed in a circular cylindrical shape, and separates the compressed air a2, which flows through an annular flow passage 24 (which will be described subsequently herein) on an outer side, and the combustion gases b1, which flow through a combustion chamber 5 on an inner side, from each other. The outer tube 10 is formed in a circular cylindrical shape, and is disposed such that it covers an outer periphery of the inner tube 12. Through the annular flow passage 24 of a ring-shaped cross-section formed between the outer tube 10 and the inner tube 12, the compressed air a2 flows to be supplied from the compressor 2 to the combustor 3. The end cover 13 is disposed on a downstream side of the burner 8 in a flow direction of the compressed air a2 that flows through the annular flow passage 24, and closes the outer tube 10 at one end thereof (the end portion on the downstream side in the flow direction of the compressed air a2 that flows through the annular flow passage 24).

The compressed air a2 that flows through the annular flow passage 24 convectively cools the inner tube 12 from a side of an outer peripheral surface of the inner tube 12. A number of air injection ports 25 is disposed through a wall of the inner tube 12, portions of the compressed air a2 that flows through the annular flow passage 24 flow as cooling air a3 into an inside of the inner tube 12 via the air injection ports 25, and form a cooling film along an inner wall surface of the inner tube 12. The remaining compressed air a2 that flows through the annular flow passage 24 without flowing into the air injection ports 25 is supplied as combustion air a4 to the burner 8. The combustion air a4 that has flowed into to the burner 8 is injected together with fuel, which has been supplied from the main fuel system 26 toward the burner 8, into the combustion chamber 5, and is mixed with the fuel for combustion.

2-2. Burner

The burner 8 includes a single pilot burner 30 (which will be described subsequently herein) arranged on a centerline of the inner tube 12, and a plurality of main burners 40 disposed surrounding the pilot burner 30.

—Pilot Burner—

The pilot burner 30 includes a single pilot fuel nozzle 31, a plurality of main fuel nozzles 32, a fuel header (cavity) 33, and a swirler 34. The pilot burner 30 is fixed on the end cover 13 by bolts or the like.

The pilot fuel nozzle 31 supplies pilot fuel to the combustion chamber 5. As the pilot fuel, oil fuel such as light oil, kerosene, or A-type heavy oil, or gas fuel such as natural gas or propane can be used. The pilot fuel nozzle 31 is located on the centerline of the inner tube 12.

The main fuel nozzles 32 supply main fuel to the combustion chamber 5. As the main fuel, gas fuel containing hydrogen or carbon monoxide, such as coke furnace gas, refinery off-gas, and coal gasification gas, can be used in addition to natural gas and propane. The main fuel nozzles 32 are disposed such that they surround a periphery of the pilot fuel nozzle 31, and are connected to the fuel header 33 as a fuel distributor. Through the swirler 34, a plurality of air injection ports 35 is disposed corresponding to the main fuel nozzles 32. The main fuel is injected from the individual main fuel nozzles 32 toward the corresponding air injection ports 35, and is injected together with the combustion air a4 from the individual air injection ports 35 into the combustion chamber 5.

About a detailed structure of the pilot burner 30, a description will be made subsequently herein.

—Main Burners—

These main burners 40 includes a plurality of main fuel nozzles 41, fuel headers (cavities) 42a and 42b, and an air injection plate 43.

In each main burner 40, the corresponding main fuel nozzles 41 are concentrically arranged. Annular cascades of the concentric main fuel nozzles 41 will be called as "a first cascade," "a second cascade," and "a third cascade" successively in this order from an inner periphery side.

The fuel headers 42a and 42b are fuel distributors, and are supported on the end cover 13. To the fuel header 42a on the inner peripheral side, the individual main fuel nozzles 41 in the first cascade are connected. To the fuel header 42b on an outer peripheral side, the individual main fuel nozzles 41 in the second and third cascades are connected.

The air injection plate 43 is a toroidal plate having a number of air injection ports 44, and is located between the main fuel nozzles 41 and the combustion chamber 5. This air injection plate 43 is used in common by the individual main burners 40, and in a region where the individual main burners 40 are configured, has the air injection ports 44 in a first cascade to a third cascade corresponding to the main fuel nozzles 41.

2-3. Main Fuel System

The main fuel system 26 includes a fuel supply source 26a, and a fuel supply conduits 26b to 26e. The fuel supply conduit 26b has a fuel shutoff valve (on-off valve) 26f, extends from the fuel supply source 26a, and on a downstream side of the fuel shutoff valve 26f, is branched into the fuel supply conduits 26c to 26e. The fuel supply conduit 26c is connected to the fuel header 33. The fuel supply conduit 26d is connected to the fuel header 42a. The fuel supply conduit 26e is connected to the fuel header 42b. A fuel flow rate control valve 26g, fuel flow rate control valve 26h, and fuel flow rate control valve 26i are disposed in the fuel supply conduit 26c, fuel supply conduit 26d, and fuel supply conduit 26e, respectively.

The main fuel, which has been supplied from the fuel supply source 26a to the fuel header 33 through the fuel supply conduits 26b and 26c, is distributed from the fuel header 33 to the individual main fuel nozzles 32, and is injected from the individual main fuel nozzles 32 into the combustion chamber 5. Similarly, the main fuel, which has been supplied from the fuel supply source 26a to the fuel headers 42a and 42b through the fuel supply conduit 26b and the fuel supply conduits 26d and 26e is distributed from the fuel headers 42a and 42b to the individual main fuel nozzles 41, and is injected from the individual main fuel nozzles 41 into the combustion chamber 5. The flow rate of the main fuel through the fuel supply conduit 26c is controlled by the flow rate control valve 26g. The flow rate of the main fuel through the fuel supply conduit 26d is controlled by the flow rate control valve 26h. The flow rate of the main fuel through the fuel supply conduit 26e is controlled by the flow rate control valve 26i. The power generation amount of the gas turbine plant 1 is controlled by controlling these flow rates.

2-4. Pilot Fuel System

The pilot fuel system 27 includes a fuel supply source 27a and a fuel supply conduit 27b. The fuel supply conduit 27b has a fuel shutoff valve (on-off valve) 27c and a fuel flow rate control valve 27d, and connects the fuel supply source 27a and the pilot fuel nozzle 31 together. The pilot fuel of the fuel supply source 27a is supplied to the pilot fuel nozzle 31 via the fuel supply conduit 27b, and is injected from the pilot fuel nozzle 31 into the combustion chamber 5. The flow rate of the pilot fuel is controlled by the fuel flow rate control valve 27d.

3. Pilot Burner

Figure 2:
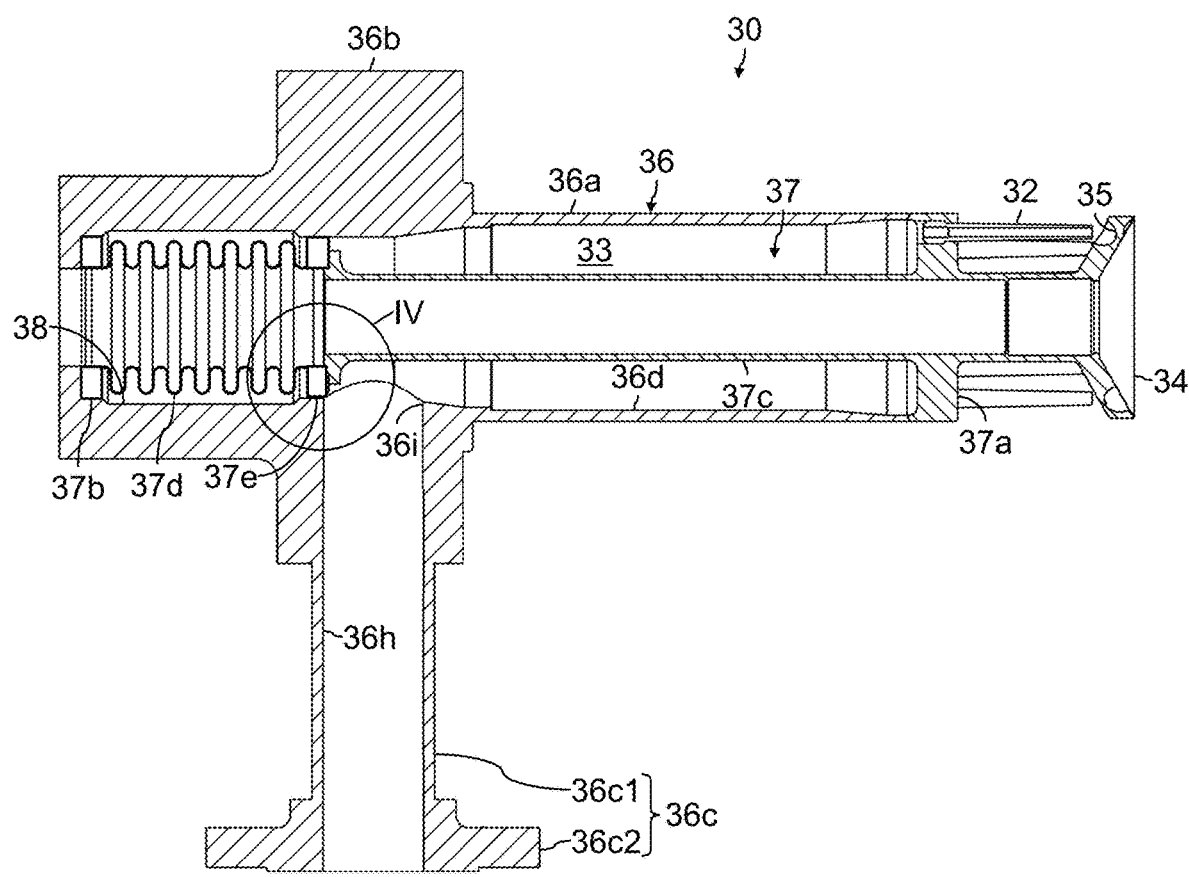
FIG. 2 is a cross-sectional view showing a detailed structure of the burner according to the first embodiment of the present invention.
Figure 3:
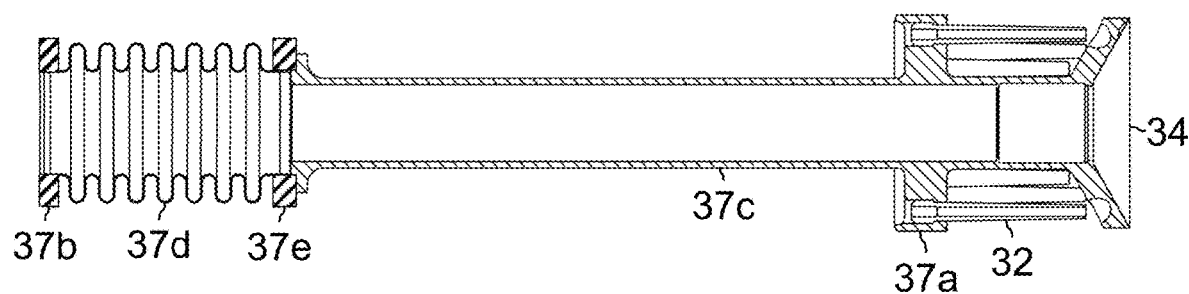
FIG. 3 is a cross-sectional view showing an inner tube removed from the burner according to the first embodiment of the present invention.
Figure 4:
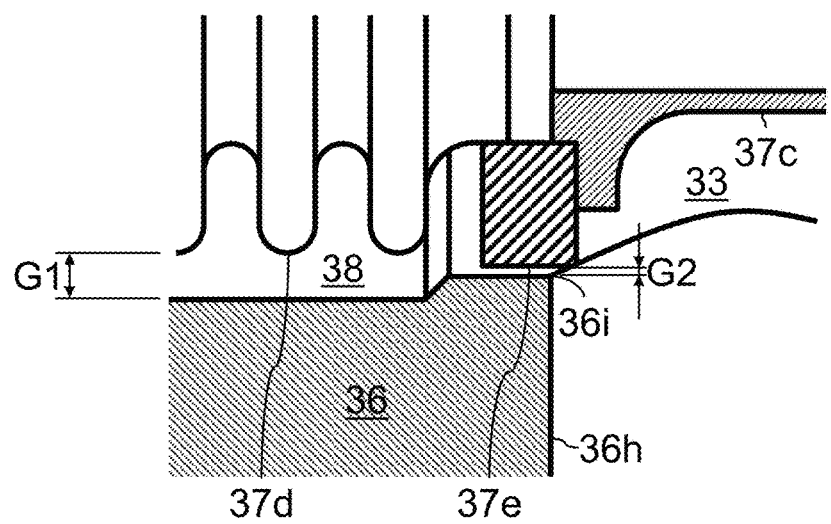
FIG. 4 is an enlarged view of a part IV in FIG. 2.
Figure 5:
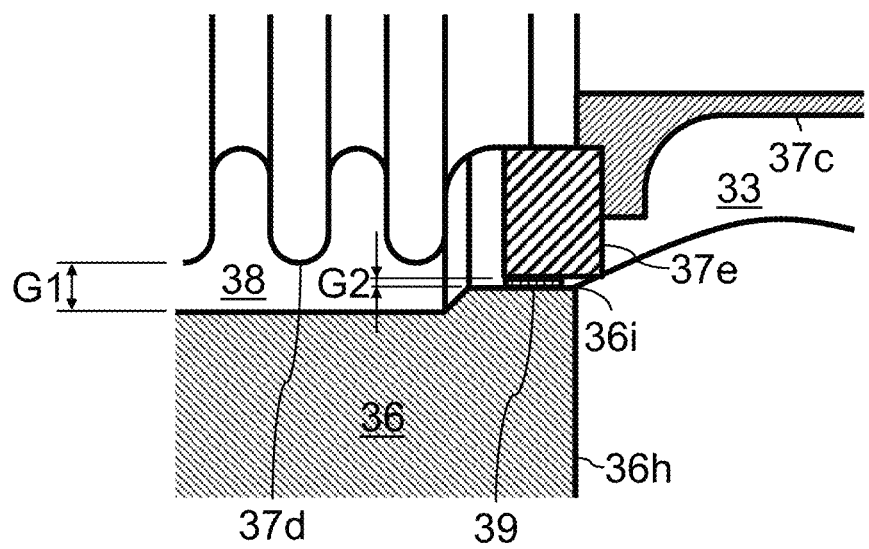
FIG. 5 is an enlarged fragmentary cross-sectional view of a burner according to a second embodiment of the present invention.

FIG. 2 is a cross-sectional view showing a detailed structure of the pilot burner 30. FIG. 3 is a cross-sectional view showing an inner tube removed from the pilot burner 30. FIG. 4 is an enlarged view of a part IV in FIG. 2. In FIG. 3 to FIG. 5, illustration of the above-mentioned pilot fuel nozzle 31 is omitted for the sake of simplification of the figures.

As shown in these figures, the pilot burner 30 has an outer tube 36 and an inner tube 37 in addition to the configuration elements already described, and has a double tube structure formed from the outer tube 36 and inner tube 37.

—Outer Tube—

The outer tube 36 is an outer shell (body) of the pilot burner 30, and includes a main body 36a, a flange 36b, and a fuel port 36c.

The main body 36a of the outer tube 36 is formed in a circular cylindrical shape, and internally has a columnar space 36d with the inner tube 37 accommodated therein. In this space 36d, a region on a side of the combustion chamber 5 from the fuel port 36c and on an outer side of the inner tube 37 makes up the above-mentioned fuel header 33. In other words, the fuel header 33 is an annular space formed between the outer tube 36 and the inner tube 37. Further, a region in the space 36d, the region being on a side opposite to the combustion chamber 5 with the fuel port 36c interposed therebetween, makes up a bellows chamber 38 (which will be described subsequently herein).

The flange 36b is a portion of the outer tube 36, and is a disk-shaped portion protruding outwardly in a radial direction from an outer peripheral surface of the cylindrical main body 36a. In other words, the pilot burner 30 has a structure such that the main body 36a intersects the flange 36b at right angles and extends centrally through the disk-shaped flange 36b. The pilot burner 30 is supported by passing the outer tube 36 through the end cover 13 (FIG. 1) and fixing the flange 36b on the end cover 13 with bolts or the like. The main body 36a of the outer tube 36 is an elongated member extending astride the flange 36b, and extends through the end cover 13 to a position where the fuel is injected into the combustion chamber 5 (in other words, close to the combustion chamber 5).

The fuel port 36c includes a conduit portion 36c1 extending outwardly in the radial direction from an outer peripheral surface of the flange 36b, and a flange portion 36c2 disposed at an end portion of the conduit portion 36c1. The conduit portion 36c1 is a portion in the shape of a straight pipe, and internally defines a fuel flow path 36h that leads to the fuel header 33. The fuel flow path 36h leads to the fuel header 33 from a radially outer side. However, the conduit portion 36c1 can also be configured in the shape of an L-shaped pipe. Also in this case, the fuel flow path 36h leads to the fuel header 33 from the radially outer side by connecting the conduit portion 36c1 to the outer peripheral surface of the flange 36b.

—Inner Tube—

The inner tube 37 includes a tip-side support portion 37a, a base-side support portion 37b, a main body portion 37c, bellows 37d, and a bulkhead member 37e. The inner tube 37 is also an elongated member like the main body 36a of the outer tube 36, and has a smaller diameter than the main body 36a of the outer tube 36. The tip-side support portion 37a, base-side support portion 37b, main body portion 37c, bellows 37d, and bulkhead member 37e are ring-shaped or cylindrical members all coaxially connected together, and their centerlines coincide with each other for convenience in designing. It is to be noted that the shape of the bulkhead member 37e is not limited to a circle but may be a rectangle.

The tip-side support portion 37a is disposed on a tip-side portion of the inner tube 37 (on a side closer to the combustion chamber 5 in a state in which the pilot burner 30 is attached to the end cover 13; this will be applied equally hereinafter), and is fixed to the outer tube 36. In this embodiment, a disk-shaped member, which is formed integrally with the main body portion 37c and extends outwardly in the radial direction from an outer peripheral surface of the main body portion 37c, is exemplified as the tip-side support portion 37a. However, the configuration of the tip-side support portion 37a is appropriately changeable, and a toroidal plate discrete from the main body portion 37c can be also adopted as the tip-side support portion 37a. Further, the tip-side support portion 37a exists without clearance between the outer peripheral surface of the main body portion 37c of the inner tube 37 and an inner peripheral surface of the main body 36a of the outer tube 36, and also plays a role of an end cover that closes the space 36d on a tip-side end portion thereof, in other words, the fuel header 33 on a tip-side end portion thereof. The above-mentioned individual main fuel nozzles 32 are arranged in an annular pattern so that they surround a periphery of the main body portion 37c of the inner tube 37, are supported on the tip-side support portion 37a, and are connected to the fuel header 33.

The base-side support portion 37b is disposed on a base-side portion of the inner tube 37 (on a side farther from the combustion chamber 5 in the state in which the pilot burner 30 is attached to the end cover 13; this will be applied equally hereinafter), and is fixed to the outer tube 36. In this embodiment, there is exemplified a configuration in which an independent ring-shaped member is fitted as the base-side support member 37b on a base-side end portion of the bellows 37d. However, the configuration of the base-side support portion 37b is appropriately changeable, and can also adopt, for example, a configuration in which the base-side support portion 37b is integrally formed with the bellows 37d. Further, the base-side support portion 37b exists without clearance between the outer peripheral surface of the inner tube 37 (the bellows 37d) and an inner peripheral surface of the outer tube 36 (the main body 36a). At only two locations of these base-side support portion 37b and tip-side support portion 37a, the inner tube 37 is supported on the outer tube 36. The distance between the base-side support portion 37b and the tip-side support portion 37a is long, and for example, longer than 300 mm.

The main body portion 37c is a cylindrical member with the pilot fuel nozzle 31 (FIG. 1) extending thereinside. The tip-side support portion 37 is located on the main body portion 37c at a position close to the combustion chamber 5, and the main body portion 37c is supported on the outer tube 36 via the tip-side support portion 37a. On a tip-side end portion of the main body portion 37c, the above-mentioned swirler 34 is disposed.

The bellows 37d are connected to a base-side end portion of the main body portion 37c, are accommodated in the bellows chamber 38, and are interposed between the main body portion 37c and the base-side support portion 37b. The base-side end portion of the bellows 37d is restrained by the outer tube 36 via the base-side support portion 37b. The bellows 37d are a component configured in a corrugated form by thin metal plates, expand and contract following thermal deformations in an axial direction of the main body portion 37c with the tip-side support portion 37a acting as an origin, and play a role to absorb thermal deformations in the axial direction of the main body portion 37c. The maximum outer diameter of the bellows 37d (the outer diameter of an outermost peripheral surface of the corrugated shape) is greater compared with the outer diameter of the main body portion 37c of the inner tube 37, and compared with the outer peripheral surface of the main body portion 37c, the outermost peripheral surface of the bellows 37d has a shorter interface distance from an inner wall surface of the space 36d of the outer tube 36.

The bulkhead member 37e is attached to a bellows-side portion of the main body portion 37c, and is arranged between the tip-side support portion 37a and the base-side support portion 37b. In this embodiment, the bulkhead member 37e is located at a position where the main body portion 37c of the inner tube 37 and the bellows 37d oppose to each other, and is fitted on the base-side end portion of the main body portion 37c and a tip-side end portion of the bellows 37d. The outer diameter of the bulkhead member 37e is greater than the outer diameter of the main body portion 37c and the outer diameter (maximum outer diameter) of the bellows 37d. Further, this bulkhead member 37e is interposed between an outlet 36i of the fuel flow path 36h, the outlet 36i opening in the fuel header 33, and the bellows 37d, and separates the fuel header 33 and the bellows chamber 38 from each other.

A small second gap G2 (FIG. 4) is however interposed between an outer peripheral surface of the bulkhead member 37e and the inner peripheral surface of the main body 36a of the outer tube 36 (in other words, an inner wall surface of the bellows chamber 38 or the fuel header 33), the inner peripheral surface and the inner wall surface facing the outer peripheral surface. This second gap G2 is smaller than a first gap G1 (FIG. 4) between the outermost peripheral surface of the bellows 37d and the inner peripheral surface of the outer tube 36 (in other words, the inner wall surface of the bellows chamber 38), the inner peripheral surface and the inner wall surface facing the outermost peripheral surface, and is, for example, 0.5 to 1 mm or so. There is no clearance between the bulkhead member 37e and the structures maintained in contact with the inner peripheral surface of the bulkhead member 37e (specifically, the main body portion 37c and the bellows 37d). The size of the second gap G2 is set from the viewpoint of allowing for certain thermal elongation differences in the radial direction between the bellows 37d and the outer tube 36, and also from the viewpoint of suppressing interference between the bellows 37d and the inner wall of the bellows chamber 38 upon vibration of the pilot burner 30.

4. Advantageous Effects (1) The pilot burner 30 has the double tube structure having the outer tube 36 and the inner tube 37, and the elongated inner tube 37 is supported on the outer tube 36 at only the two locations of the tip-side support portion 37a and base-side support portion 37b. The difference in elongation between the outer tube 36 and the inner tube 37 changes according to the situation, for example when low temperature fuel is supplied in a condition heated by the combustion air a4 at startup. Differences in elongation between the outer tube 36 and the inner tube 37 arise primarily in the axial direction, and these differences in elongation in the axial direction can be flexibly absorbed by the bellows 37d.

In addition, the pilot burner 30 is vibrated due to mechanical vibrations and combustion vibrations during operation of the gas turbine engine, so that vibrations occur on the inner tube 37 with the tip-side support portion 37a and the base-side support portion 37b acting as nodes for amplitude. Concerning the main body portion 37c of the inner tube 37, the fuel header 33 is interposed between an outer wall surface of the main body portion 37c and an inner wall surface of the outer tube 36 (main body 36a) so that a suitable space exists. In principle, the main body portion 37c therefore does not interfere with the inner wall surface of the outer tube 36. With respect to the bellows 37d on the inner tube 37, however, the space between the outermost peripheral surface of the bellows 37d and the inner wall surface of the outer tube 36 (the inner wall surface of the bellows chamber 38) is small compared with the fuel header 33, and therefore the bellows 37d may interfere with the inner wall surface of the outer tube 36 if the inner tube 37 vibrates at a greater amplitude. In particular, as the bellows 37d are configured of the thin metal plates, their interference with another structure is not preferred.

The bulkhead member 37e is therefore fitted in the main body portion 37c of the inner tube 37 between the tip-side support portion 37a and the base-side support portion 37b in this embodiment. As the above-mentioned second gap G2 is interposed between the outer peripheral surface of the bulkhead member 37e and the inner peripheral surface of the outer tube 36, this second gap G2 allows for a certain range of differences in thermal elongation in the radial direction between the bellows 37d and the outer tube 36, and can protect the bellows 37d. In addition, the size of this second gap G2 is appropriately set in a range smaller than the first gap G1 between the outermost peripheral surface of the bellows 37d and the inner peripheral surface of the outer tube 36. Owing to this size of the second gap G2, the bulkhead member 37e interferes with the inner peripheral surface of the outer tube 36 between the tip-side support portion 37a and the base-side support portion 37b, and plays the role of a stopper that suppresses the amplitude of the inner tube 37. It is therefore possible to effectively restrict movements of the bellows 37d in the radial direction, and also to suppress interference between the bellows 37d and the outer tube 36. The arrangement of the bulkhead member 37e near the bellows 37d enables to effectively damp vibration of the bellows 37d.

As described above, the pilot burner 30 in this embodiment enables to flexibly cope with thermal deformations using the bellows 37d, and at the same time to effectively suppress damage to the bellows 37d.

(2) In the case of this embodiment, it is configured to separate the fuel header 33 and the bellows chamber 38 from each other with the bulkhead member 37e by arranging the bulkhead member 37e between the outlet 36i of the fuel flow path 36h, the outlet 36i opening in the fuel header 33, and the bellows 37d. Owing to this configuration, the bellows 37d, as a barrier, plays the role of a damper, and can suppress the fuel, which is supplied from the fuel flow path 36h toward the fuel header 33, from flowing with great force into the bellows chamber 38. Even if foreign matter enters the pilot burner 30 along with the fuel supplied toward the fuel header 33, the foreign matter can be suppressed from entering the bellows chamber 38 and interfering with the bellows 37d, thereby enabling to protect the bellows 37d from the foreign matter accompanying the fuel. In addition, the pilot burner 30 in this embodiment also has the merit of enabling to suppress the bellows 37d from exposure to a flow of low temperature fuel and to suppress differences in elongation between the bellows 37d and its surrounding structure.

Second Embodiment

FIG. 5 is an enlarged fragmentary cross-sectional view of a pilot burner according to a second embodiment of the present invention. This figure corresponds to FIG. 4 of the first embodiment. In FIG. 5, the same or corresponding elements as those in the first embodiment are identified by the same reference characters as in the first embodiment, and their description is omitted as appropriate.

This embodiment is different from the first embodiment in that a sealing member 39 is included to seal the second gap G2 between the outer peripheral surface of the bulkhead member 37e and the inner peripheral surface of the outer tube 36. The seal member 39 is a ring-shaped member commensurate with the shape of the second gap G2, and use of a resilient material is desired so as to allow for changes in relative radial elongation difference between the bellows 37d and the outer tube 36. If the sealing member 39 is disposed, the second gap G2 may be set a little greater than in the first embodiment. In other respects, this embodiment is similar to the first embodiment.

According to this embodiment, it is possible, in addition to similar advantageous effects as in the first embodiment, to separate with the sealing member 39 between the fuel header 33 and the bellows chamber 38, and hence to seal the flow of the fuel, which is supplied toward the fuel header 33, into the bellows chamber 38. As a consequence, it is possible to more effectively suppress foreign matter, which accompanies the fuel supplied toward the fuel header 33, from interfering with the bellows 37d. It is also possible to suppress the fuel from entering the bellows chamber 38 and to suppress stagnation of the fuel in the bellows chamber 38.

DESCRIPTION OF REFERENCE CHARACTERS

3: Combustor
31: Pilot fuel nozzle
32: Main fuel nozzle
36: Outer tube
36h: Fuel flow path
37: Inner tube
37a: Tip-side support portion
37b: Base-side support portion
37c: Main body portion
37d: Bellows
37e: Bulkhead member
39: Sealing member
G1: First gap
G2: Second gap

What is claimed is:

1. A burner of double tube structure comprising:
an outer tube; and
an inner tube, wherein the inner tube includes:
  a tip-side support portion fixed on the outer tube,
  a base-side support portion fixed on the outer tube,
  a main body portion supported by the tip-side support portion,
  bellows interposed between the main body portion and the base-side support portion,
  a bulkhead member attached at a position between the tip-side support portion and the base-side support portion,
  a first gap defined between an outermost peripheral surface of the bellows and an inner peripheral surface of the outer tube, and
  a second gap defined between an outer peripheral surface of the bulkhead member and the inner peripheral surface of the outer tube, the second gap being smaller than the first gap,
wherein the outer tube includes:
  a main body formed in a circular cylindrical shape,
  a flange protruding outwardly in a radial direction from an outer peripheral surface of the main body, and
  a fuel port extending outwardly in the radial direction from an outer peripheral surface of the flange,
wherein the burner further comprises:
  a fuel header formed between the outer tube and the inner tube,
  a plurality of main fuel nozzles connected to the fuel header,
  a pilot fuel nozzle extending inside the inner tube, and
  a radial fuel flow path formed inside the fuel port and extending in the radial direction, the radial fuel flow path leading to the fuel header from the radially outer side,
wherein an outlet of the radial fuel flow path opens to the fuel header, and the bulkhead member is interposed between the outlet of the radial fuel flow path and the bellows,
the bulkhead member is interposed between the bellows and the plurality of main fuel nozzles, and
the bulkhead member separates a volume in which the bellows are positioned from a volume defined by the outlet of the radial fuel flow path and the fuel header.

2. The burner according to claim 1, further comprising:
a sealing member that seals the second gap between the outer peripheral surface of the bulkhead member and the inner peripheral surface of the outer tube.

3. A combustor comprising the burner according to claim 1.

4. The burner according to claim 1, wherein the base-side support portion of the inner tube, the bellows, the outlet of the radial fuel flow path and the plurality of main fuel nozzles are disposed sequentially along an axis of the inner tube from the base-side support portion toward the tip-side support portion of the inner tube.

5. The burner according to claim 4, wherein a difference in elongation between the outer tube and the inner tube, during operation of the burner, is absorbed by the bellows.

* * * * *